United States Patent
Huszcz

(10) Patent No.: US 6,780,000 B2
(45) Date of Patent: Aug. 24, 2004

(54) APPARATUS FOR MAKING MEATBALLS AND THE LIKE

(76) Inventor: Peter Huszcz, 7088 Shadow Ridge Dr., Greely, Ontario (CA), K4P 1B8

( * ) Notice: Subject to any disclaimer, the term of this patent is extended or adjusted under 35 U.S.C. 154(b) by 653 days.

(21) Appl. No.: 09/828,963

(22) Filed: Apr. 10, 2001

(65) Prior Publication Data

US 2004/0060636 A1 Apr. 1, 2004

(51) Int. Cl.⁷ .............................................. A21C 7/04
(52) U.S. Cl. ...................... 425/298; 425/305.1; 425/332
(58) Field of Search ................................. 425/297, 298, 425/305.1, 332

(56) References Cited

U.S. PATENT DOCUMENTS

| | | | | |
|---|---|---|---|---|
| 786,042 | A | * 3/1905 | Loncaric | 425/332 |
| 978,440 | A | * 12/1910 | Eggenhofer | 425/332 |
| 1,417,446 | A | 5/1922 | Brigham et al. | |
| 1,492,738 | A | 5/1924 | Müller et al. | |
| 1,944,112 | A | * 1/1934 | Schroder | 425/332 |
| 1,970,336 | A | * 8/1934 | Pointon et al. | 425/332 |
| 2,094,289 | A | * 9/1937 | Blum et al. | 425/332 |
| 3,381,631 | A | 5/1968 | Hörnlein et al. | |
| 3,666,388 | A | 5/1972 | Oberwelland et al. | |
| 4,362,497 | A | 12/1982 | Lifshitz | |
| 4,382,768 | A | 5/1983 | Lifshitz et al. | |
| 4,511,318 | A | * 4/1985 | Kolodesh et al. | 425/332 |
| 4,664,928 | A | 5/1987 | McCaffrey | |
| 4,950,147 | A | * 8/1990 | Willard et al. | 425/332 |
| 5,277,569 | A | * 1/1994 | Anetsberger | 425/332 |
| 5,510,135 | A | 4/1996 | Galder | |
| 5,733,470 | A | 3/1998 | Roth et al. | |

* cited by examiner

Primary Examiner—James P. Mackey
(74) Attorney, Agent, or Firm—L. Anne Kinsman; Borden Ladner Gervais LLP

(57) ABSTRACT

Apparatus is provided herein for making a plurality of spherical products, e.g., meat balls. The apparatus includes a base. A tray support platform is mounted on the base for tethered buffetted motion with respect to the base. A tray having an upper non-stick surface is mounting on, and is held to, the tray support platform. A grid consisting of an array of compartments constituted by a plurality of intersecting walls and having an open bottom is supported on the tray.

10 Claims, 3 Drawing Sheets

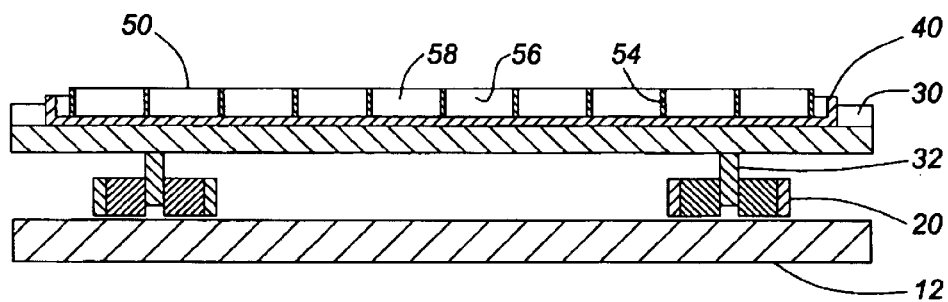
FIG. 2
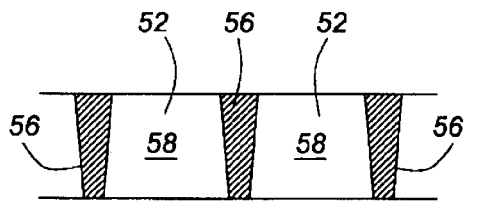 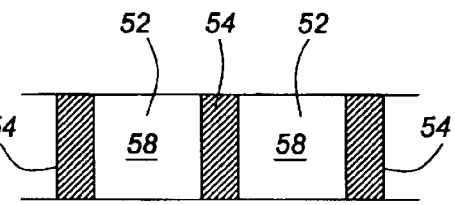
FIG. 3     FIG. 4
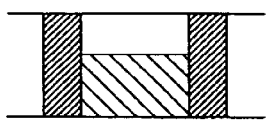 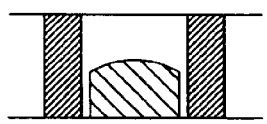 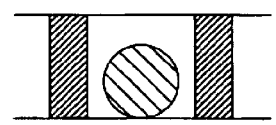
FIG. 6A     FIG. 6B     FIG. 6C

APPARATUS FOR MAKING MEATBALLS AND THE LIKE

BACKGROUND OF THE INVENTION (a) Field of the Invention

The present invention relates to an apparatus for forming ball-like or roundish products. This invention also relates to a method for making such ball-like products, e.g., meatballs involving the use of such apparatus.

(b) Description of the Prior Art

In an effort to improve quality, productivity, reduce waste and provide a compact product for cooking and serving ball-like food product, it has been a common practice to prepare such product by shaping a piece of material one by one by hand. The above method is time consuming and unacceptable in restaurants. Accordingly, apparatus have been proposed to make such method mechanical.

There are many patents which are directed to the formation, by mechanical centrifugal means, of a cylindrical food product which includes a hollow portion which is filled with a suitable filling. Among such patents are the following:

U.S. Pat. No. 1,417,446 patented May 23, 1932 to N. C. Brigham. This patent provided method of and apparatus for partially forming the coating of a confection, then filling the partially formed coating with the filling material and finally closing the coating or completing the confection. The apparatus comprises a rotatable member or mould having a suitably shaped depression therein whereby when the coating is in a semi-liquid or melted state and at a suitable temperature is introduced into the depression of the mould and rotated at a suitable speed, the coating material will be forced up the inner walls of the depression, by the combined action of gravity and centrifugal force. The member is then brought down to a suitable speed of rotation or the rotation stopped if desired, it being assumed that the coating material has then set or cooled sufficiently to receive the filling material. The filling material is now introduced, after which the remaining portion of the coating is added, and, after uniting with the previously formed partial coating thus forming the complete confection.

U.S. Pat. No. 1,492,738, patented May 6, 1924 by A. Muller, that patent provided an apparatus for making bodies in the form of shells from plastic chocolate and the like. The apparatus included a mechanically operated means for subjecting the moulds to centrifugal action around a vertical axis and simultaneously to reciprocating vertical movement.

U.S. Pat. No. 3,381,631, patented May 7, 1968 by R. Hornlein et al. That patent provides an installation for the production of hollow chocolate bodies, having an endless conveying path for a plurality of individual three-dimensionally rotatable mould frames arranged in a row endlessly one behind the other, with common conveying means for the common further conveying of the mould frames and common drive means for the three-dimensional rotation of the mould frames, also with arrangements for the halting of the mould frames in their three-dimensional rotational movements. In more specific terms, each mould frame is rotatably mounted in a carrier fork, which is arranged rotatably about its fork central spindle on a conveying trolley movable along the endless conveying path and can be set in rotation by the rotational-drive means, about a transverse spindle extending transversely of the fork central spindle through the fork heads, and is in drive communication with the same rotational drive means through at least one of the pivot bearings, the conveying path comprising a series of working stations, for example, for unlocking and opening the moulds, withdrawal of the moulded chocolate bodies, insertion of wrapping foils, filling of chocolate mass, closing and locking of the mould frames, through which the mould frames are passed, being further held and conveyed by the carrier forks which in the meantime are halted in their rotational movement about the fork central spindle and prevent a rotational movement of the mould frames about the fork transverse spindle.

U.S. Pat. No. 3,666,388 patented May 30, 1972 by H. Oberwellain et al. That patent provided a method of and apparatus for producing hollow sweetmeats by spinning an open top mould containing a measured quantity of castable confectionery material or dispensing such a quantity of material into an open top mould from a rotating dispenser so that a hollow body corresponding to the internal shape of the mould is formed by centrifugal force acting on the castable material, cooling the body until it is set, and ejecting the body from the mould.

It is therefore noted that there does not appear to be any mechanical apparatus for forming spherical objects from individual units of material.

SUMMARY OF THE INVENTION (a) Aims of the Invention

It is an object of this invention to provide a novel, industrially and domestically applicable method and apparatus for reshaping deformable material to provide a ball-like product, which can be applied both to food and non-food materials.

(b) Statement of Invention

The present invention provides an apparatus for making a plurality of spherical products, the apparatus comprising a base, a tray support platform mounted on the base for tethered buffetted motion with respect to the base, a tray having an upper non-stick surface, for mounting on, and being held to, the tray support platform, and a grid comprising a plurality of compartments defined by a plurality of intersecting walls, the grid having an open bottom which is supported on the tray.

The present invention also provides a method for forming a plurality of spherical products from a deformable material comprising the steps of providing a base, providing a tethered support which is movable in a buffetted motion, providing a tray having an upper non-stick surface on the tethered support, placing a sheet of deformable material on the tray, pressing an open grid comprising a plurality of compartments defined by a plurality of intersecting walls into the sheet of deformable material until the bottom thereof contacts the upper surface of tray and inducing a buffetted motion of the tray on the tethered support until the deformable material is transformed into a plurality of spherical articles.

(c) Other Features of the Invention

By a first feature of the apparatus, the tray support platform is of general "H"-shape with two arms and a connecting body, the ends of the arms preferably including upright flanges thereon.

By a second feature of the apparatus, the body is pivotally-secured near each end thereof adjacent the arms to a bearing assembly, thereby to provide the tethering.

By a third feature of the apparatus, each bearing assembly comprises a pair of transversely-spaced-apart bearings, one of the bearings being rotationally mounted on the base, and the other of the bearings being floating, the bearing assemblies being connected to one another by a pair of connecting rods, the body being pivotally-secured to an associated one of the floating bearings by means of a pivot shaft.

By a fourth feature of the apparatus, the tray is a rectangular tray including a perimetral upstanding flange.

By a fifth feature of the apparatus, the grid is of a complementary shape to fit on the rectangular tray, and comprises an array of rectangular compartments.

By a sixth feature of the apparatus, the array of compartment is defined by respective four walls of equal heights, e.g., where the walls are tapered, i.e., where the tapered walls provide a larger area at the bottom of the grid than at the top of the grid.

By a seventh feature of the apparatus, the upstanding flanges of the tray are adjustable in height, thereby to control the thickness of a sheet of deformable material placed therein, which in turn controls the diameter of the spherical bodies.

By a first feature of the method, the method includes selecting the deformable material from the group consisting of ground meat, minced meat, minced fish paste, vegetable pastes, mashed potatoes, ragout, ground beef, ground port, ground turkey, ground chicken and dough, thereby to provide a plurality of ball-like such material, e.g., by providing the deformable material as a sheet of ground meat, thereby to provide a plurality of meat balls.

By a second feature of the method, the method comprises carrying out the buffetted motion for at least about 30 seconds to about 1 minute.

By a third feature of the method, the method comprises controlling the thickness of the sheet of deformable material, thereby to control the diameter of the spherical products.

(d) Generalized Description of the Invention

The method and apparatus according to the present invention can be used for preparing food products having various sizes. The method of the present invention may be used to prepare food products having a volume up to about 17.0 cm$^3$ (approx. diameter 4 cm.). A volume of about 14.0 cm$^3$ (approx. diameter 3 cm.) would be a normal size for meat balls. The smaller size can be used for hors d'oeuvres and the larger sizes could be used in meal preparations.

The method of the present invention can be used to prepare food products having a volume of any reasonable size. Normally, volumes can range from about 1 cm diameter to about 4 cm diameter ball-like food product.

The size of the products is determined by the thickness of the food product sheet which is placed on the tray surface before shaping or processing by the apparatus of the present invention. In order to make the method of the present invention workable, the product must have the quality of being tacky to the upper surface of the tray, and the tray should preferably have a non-stick surface. This will produce substantially spherical or ball-like products.

Deformable materials which are suitable for use in a method of the present invention are generally cohesive and viscous materials. Examples include mashed potato, minced fish pastes, vegetable pastes, ground meat, minced meat, ragout, putty, etc. Thus, the food material preferably is of ground or minced beef, pork, turkey, chicken or fish, dough, mashed vegetables, pastes, or ragout.

In a preferred embodiment, this invention provides apparatus and methods for shaping ground beef into meatballs, of near equal and consistent size. The method of the present invention thus provides food balls in a simple and consistent manner.

The apparatus and method of the present invention may produce ball-like food and non-food products. The apparatus of the present invention includes, as an essential element, a grid which comprises an array of compartments of equal size. The bottom of each compartment is open, but the top may be open or closed. The size and number of compartments are not limited. A preferable dimension of a compartment is a 6 cm by 6 cm square; however other sizes and shapes are also workable i.e. a regular hexagon, etc.

There is no limit to the number of compartments in the array. A reasonable size can range from a grid of 64 (8 by 8) compartments to a grid of 9 (3 by 3) compartments.

There is no limit to the height of the grid walls; however an optimum height for a compartment wall is about ⅔ of the width of the compartment. For example, for a width of about 6 cm, an optimum height is to be about 4 cm.

In one method of this invention, the tray is placed on top of the tray support. The starting deformable material (e.g., minced meat) is spread out evenly into a sheet on the tray. The precision and thickness of the spreading of the material will determine the consistency and equality of size of the ball products. The tray may optionally have adjustable height perimetral flanges to assure substantially-even thickness of the spread sheet. The grid is then pressed into the evenly spread deformable material on the tray. The excess deformable material outside the grid is removed. The tray/grid unit is either now placed on the tray support platform or has been pre-placed thereon. The tray/grid is rotated rapidly in a buffeting manner on the tray support platform holder in a tethered circular motion until the deformable material has acquired the desired ball-like shape. The process takes less than about 1 minute, but normally should not take more than about 30 seconds. The grid and the tray are preferably constructed of food grade plastic. The material selected should have a smooth surface, but the tray should have an upper, non-stick surface.

BRIEF DESCRIPTIN OF THE DRAWINGS

In the accompanying drawings:

FIG. 2 is a central longitudinal cross-section of the apparatus shown in FIG. 1.

FIG. 3 is a section through the grid, showing tapered walls.

FIG. 4 is a section through the grid, showing parallel units.

FIG. 6, as FIG. 6a, FIG. 6b and FIG. 6c show, in schematic form, the steps in the production of the ball product.

Figure 1:
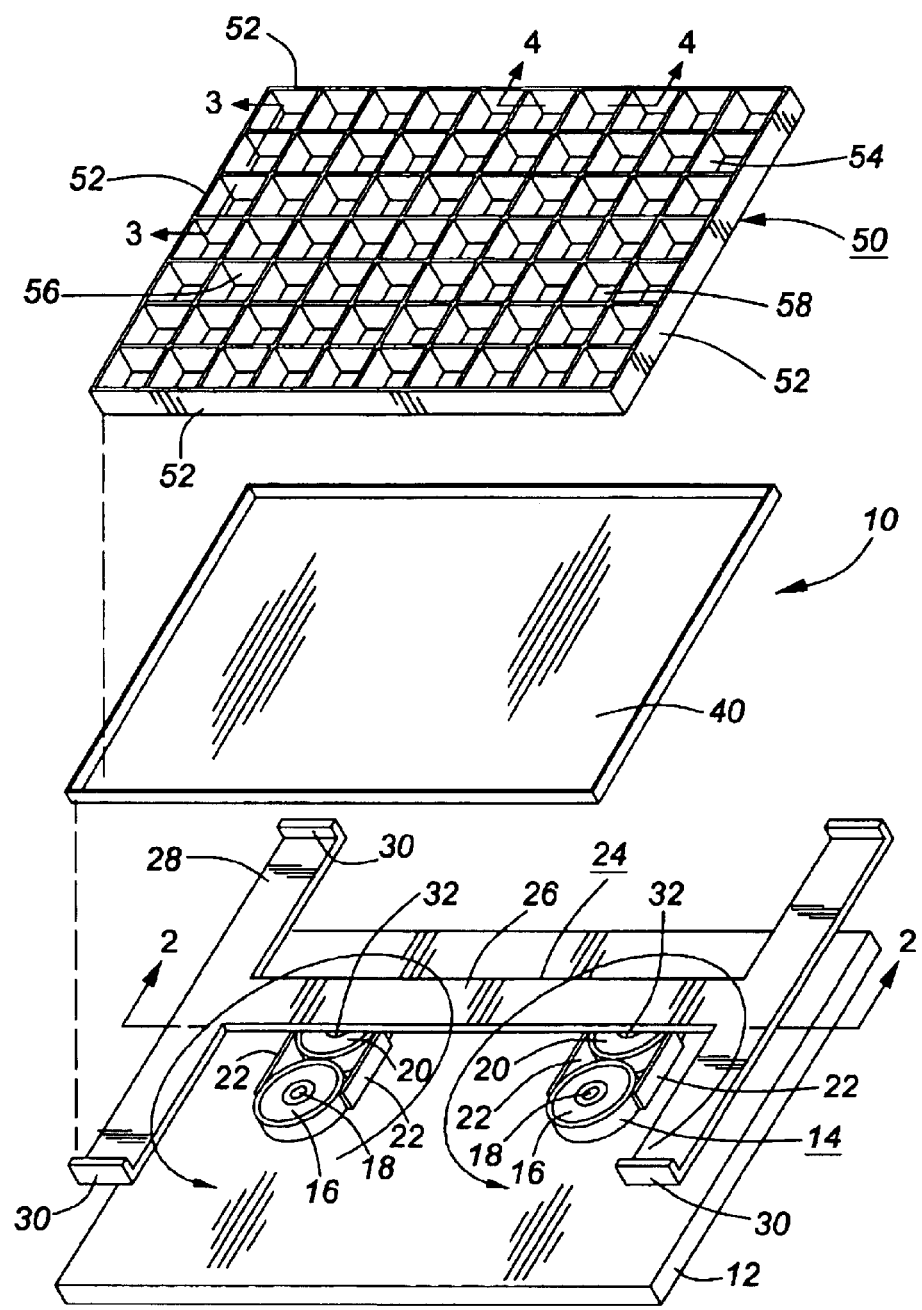
FIG. 1 is an exploded isometric view of the operation of one embodiment of an aspect of this invention.

DESCRIPTION OF PREFERRED EMBODIMENTS (a) Description of FIG. 1 and FIG. 2

One embodiment of the present invention is shown in FIG. 1 and FIG. 2. The apparatus 10 includes a base member 12 upon which is mounted a pair of spaced-apart bearing assemblies 14. Each bearing assembly includes a secured bearing 16 which is rotationally mounted on pin 18 to base member 12. It also includes a floating bearing 20, which is tethered to the secured bearing 16 by a pair of spaced-apart connecting rods 22.

A tray support platform 24 is secured to the base. The tray support platform 24 includes a main body 26 and two lateral arms 28. Each end of each lateral arm 28 includes terminal upstanding flanges 30. The main body 26 is provided with a pair of depending axes 32 near the ends of the body 26 adjacent the arms 28. Each axle 32 is rotationally secured within its associated floating bearing 20.

The apparatus 10 also includes a separate tray 40. Tray 40 is preferably formed of food grade synthetic plastic material, well-known in the art. While not shown, the tray 40 may be provided with either fixed or vertically-adjustable perimetral walls, to facilitate the spreading of a uniform layer of the deformable material on the tray 40.

Finally, the apparatus 10 includes a grid 50. Grid 50 includes a perimetral wall 52 and an array of intersecting transverse walls 54 and longitudinal walls 56 to form a plurality of rectangular, i.e., square compartments 58.

(b) Description of FIG. 3 and FIG. 4

The transverse walls 54 and/or the longitudinal walls 56 of the grid 50 may be tapered (as shown in FIG. 3) or non-tapered (as shown in FIG. 4).

Figure 5:
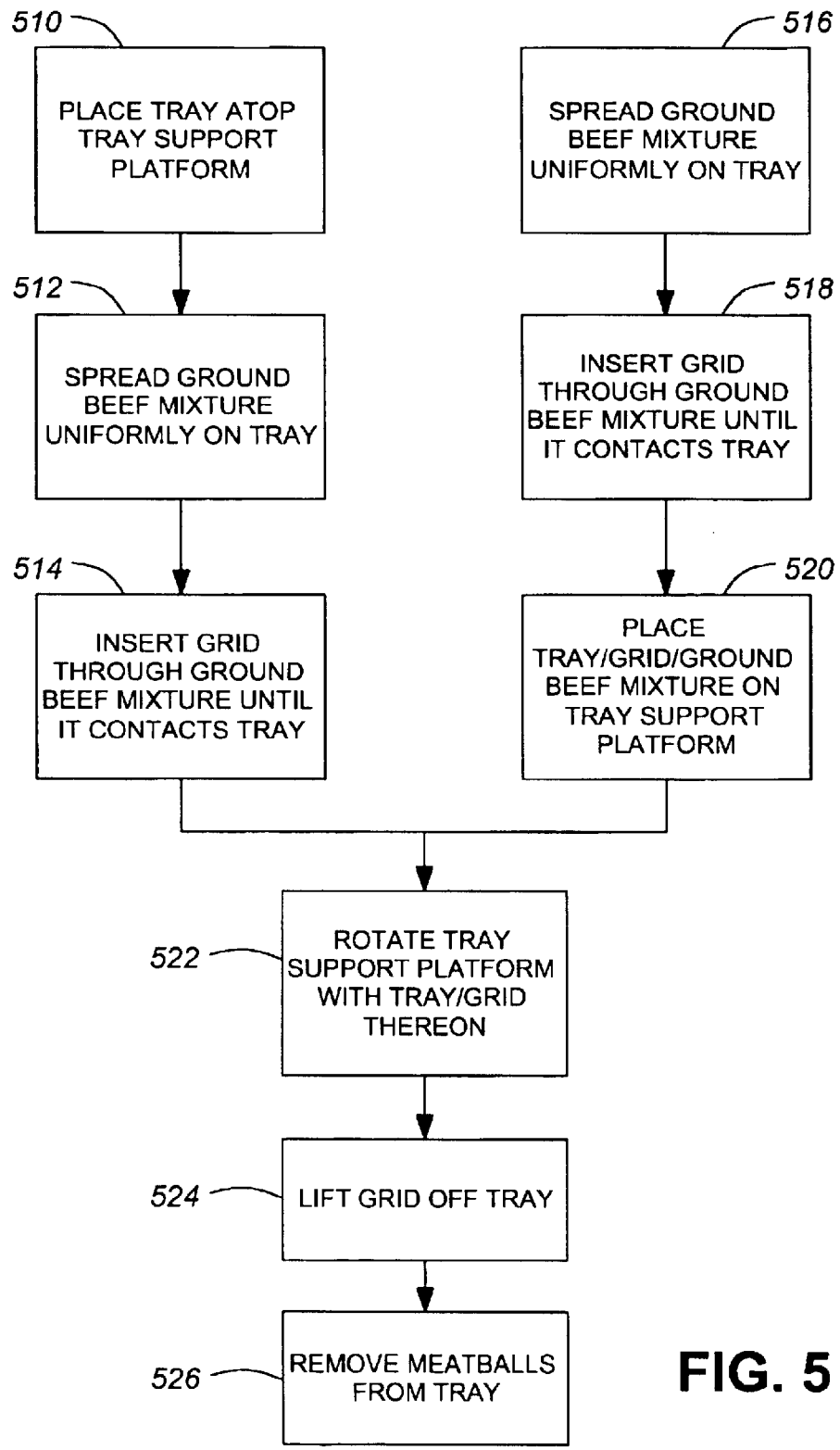
FIG. 5 is a schematic fluid channel descriptive of the method of an aspect of this invention.

(c) Description of FIG. 5

FIG. 5 is a flow chart of two alternative methods according to the present invention.

The first step in one alternative method of the present invention involves placing and securing the tray atop the tray support platform (BLOCK 510), then a ground beef mixture is spread uniformly on the tray (BLOCK 512). Then the grid is placed a top the spread ground beef mixture and is pressed downwardly until its bottom edges contact the tray (BLOCK 514).

The first step in a second alternative method of the present invention involves uniformly spreading a ground beef mixture on the tray (BLOCK 516). Then the grid is placed atop the spread ground beef mixture and is pressed downwardly until its bottom edges contact the tray (BLOCK 518). Then the tray/grid/ground beef mixture is placed and secured upon the tray support platform (BLOCK 520).

The two alternative methods then converge, and the tray support platform, with the tray/grid/ground beef mixture therein is rotated in a buffetted tethered manner (BLOCK 522), to convert the ground meat mixture in the array of compartments into meat balls, (and will be explored further with reference to FIG. 6). This tethered buffetted rotation takes from 30 to 60 seconds or more.

The grid is then lifted off the tray, exposing the plurality of meat balls (BLOCK 524). The meat balls are then removed from the tray (BLOCK 526).

(c) Description of FIG. 6

FIG. 6 illustrates schematically the conversion of a cube of ground meat mixture into a meat ball. The cube of a ground meat is shown in FIG. 6a. The tethered buffetted rotation of the tray support platform induces flow in a pseudothixotropic manner in the ground meat, and converts the cube of ground meat into an intermediate shape shown in FIG. 6b. Continued tethered buffetted rotation of the tray support platform results in the production of the meat balls in FIG. 6c.

CONCLUSION

The making of equally-sized products is a significant advantage of the method and apparatus of aspects of this invention. Substantially-equally-sized ball products can be created by the method and apparatus of the invention in a very short time of under about 60 seconds and usually takes about 30 seconds.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. Apparatus for making a plurality of spherical product comprising:

a base;

a tray support platform mounted on said base for tethered buffetted motion with respect to said base;

a tray having an upper friction surface, for mounting on, and being held to, said tray support platform; and a grid comprising a plurality of compartments defined by a plurality of intersecting walls, said grid having an open bottom, said grid being supported on said tray.

2. The apparatus of claim 1, wherein said tray support platform is of general "H"-shape with two arms and a connecting body, the ends of said arms including upright flanges thereon.

3. The apparatus of claim 2, wherein said connecting body is pivotally-secured near each end thereof adjacent said arms to a bearing assembly, thereby to provide said tethering.

4. The apparatus of claim 3, wherein each said bearing assembly comprises a pair of transversely-spaced-apart bearings, one said bearing being rotationally mounted on said base, and the other said bearing being floating, said bearings being connected to one another by an associated pair of connecting rods, said body being pivotally-secured to an associated one of said floating bearings by means of an associated pivot shaft.

5. The apparatus of claim 1, wherein said tray is a rectangular tray including a perimetral upstanding flange.

6. The apparatus of claim 5, wherein said grid is of a complementary rectangular shape to fit on said tray, and comprises an array of rectangular compartments.

7. The apparatus of claim 6, wherein each compartment of said array of compartment is defined by respective four walls of equal heights.

8. The apparatus of claim 7, wherein said walls are tapered.

9. The apparatus of claim 8, wherein said tapered walls provide a larger area at the bottom of the grid than at the top of the grid.

10. The apparatus of claim 5, wherein said perimetral upstanding flange of said tray is adjustable in height, thereby to control the thickness of a sheet of deformable material placed therein, which in turn controls the diameter of the spherical bodies.

* * * * *